Oct. 25, 1960 F. L. F. STEGHART ET AL 2,957,980

ELECTRONIC INTEGRATORS AND AUTOMATIC CONTROLLERS

Filed Oct. 4, 1955 4 Sheets-Sheet 1

INVENTORS:
FRITZ LUDWIG FELIX STEGHART
PETER LESLIE KERSHAW
BY
Richardson, David and Nordon
ATTY'S Oct. 25, 1960 F. L. F. STEGHART ET AL 2,957,980

ELECTRONIC INTEGRATORS AND AUTOMATIC CONTROLLERS

Filed Oct. 4, 1955 4 Sheets-Sheet 2

INVENTORS:
FRITZ LUDWIG FELIX STEGHART
PETER LESLIE KERSHAW

By Richardson, David and Nordon
ATTYS

Oct. 25, 1960 F. L. F. STEGHART ET AL 2,957,980

ELECTRONIC INTEGRATORS AND AUTOMATIC CONTROLLERS

Filed Oct. 4, 1955 4 Sheets-Sheet 3

INVENTORS:
FRITZ LUDWIG FELIX STEGHART
PETER LESLIE KERSHAW

By Richardson, David and Nordon

ATTY'S

Oct. 25, 1960 F. L. F. STEGHART ET AL 2,957,980

ELECTRONIC INTEGRATORS AND AUTOMATIC CONTROLLERS

Filed Oct. 4, 1955 4 Sheets-Sheet 4

INVENTORS:
FRITZ LUDWIG FELIX STEGHART
PETER LESLIE KERSHAW
By Richardson, David and Nordon
ATTYS 2,957,980

ELECTRONIC INTEGRATORS AND AUTOMATIC CONTROLLERS

Fritz Ludwig Felix Steghart and Peter Leslie Kershaw, both of North Circular Road, West Twyford, London NW. 10, England Filed Oct. 4, 1955, Ser. No. 538,498

Claims priority, application Great Britain Oct. 18, 1954

9 Claims. (Cl. 328—127)

This invention relates to a precision integrating controller for use with computers and other electronic apparatus.

Integrators as used in automatic controllers, computers and other electronic apparatus have, in the past, been arranged in either of two different ways.

One way is to use a feed-back circuit of proper transfer characteristics, arranged across an amplifier of effectively infinite amplification to obtain true integration of the input. This arrangement has, however, the disadvantage of requiring an exceptionally high gain amplification. The other way is the use of electronic integrators which rely on the charging of a condenser, when the value to be integrated is made proportional to a voltage and this integrating voltage is applied to a resistance and capacitance circuit.

This applied voltage on flowing through the resistance is converted into an equivalent current (the constant of proportionality being the resistance of the resistor). The capacitor has the property to integrate this current (the constant of proportionality being the capacitance of the capacitor).

In practice the electron flow into the capacitor is reduced by the back voltage built up across the capacitor. This back voltage produces an exponential (rather than linear) rise in voltage and hence limits the usefulness of the resistance-capacitance circuit as an integrator.

It is known to be theoretically possible to overcome this difficulty by introducing a voltage source into the resistance-capacitance circuit which has the property of developing a voltage whose magnitude is equal to and whose polarity is opposite to that of the capacitor voltage in series with the resistance-capacitance circuit. This eliminates the effect of back voltage on the resistance element, and consequently, the instantaneous magnitude of the current flowing through the resistance is always precisely proportional to the input voltage.

It is the principal object of the present invention to provide an integrating circuit which will work with great economy in electronic means and especially in thermionic valves.

According to the present invention, the voltage across the condenser of an integrating resistance-capacitance circuit is taken to substantially linear amplifying means, the output of which is fed through a high insulation substantially linear feed back connection to the resistance-capacitance circuit to give a compensating voltage balancing out the voltage of the capacitor.

Further according to the invention the amplifying means is an electronic valve which transforms the capacitor voltage into an output current. Instead of a thermionic valve, a transistor circuit may be employed.

According to another feature of the invention, a magnetic amplifier (saturable reactor) is used to provide the linear high insulation feed back connection between the output of the amplifying means and the R.C. circuit.

Valves and vibrators are alternative means for high insulation feed back connections, instead of the saturable reactor but without its simplicity.

In practical terms an integrating circuit, according to the present invention, will give substantially better and even twice to ten times greater, accuracy than an equivalent boot-strap circuit and the accuracy of the integration is no longer inherently dependent on the amplification used but rather depends on the linearity of the amplifier and feedback connection.

By comparing two particular circuits it has been found that an accuracy of integration of 0.1% has been achieved where previously a 1% error was inevitable. The integrating circuit according to the present invention can, of course, be usefully employed in a great variety of electronic apparatus and in the case of an electronic controller proportional, integral and derivative action can be obtained by introducing into the circuit connecting the integrating capacitor to the amplifying means, voltages which are a function of the proportional element and the derivative element to give a complete three-term controller with independent settings.

If the time lag inherent in most controllers is neglected, the behaviour of controllers can be reduced to three main forms:

(A) Proportional (P) behaviour. The output value $y$ is proportional to the input error $x_w$.

$$y(t)=r_0.x_w(t)$$

(B) Integral (I) behaviour. The rate of variation $y'$ of the output value is proportional to the input error $x_w$, and $$y'(t)=r_{-1}.x_w(t)$$

The output value $y$ is therefore a time integral of the error $$y(t)=r_{-1}\int x_w(t)dt$$

(C) Differential (D) behaviour. The output value $y$ is proportional to the rate of change $x_w'$ of the input error $x_w$, the equation being $$y(t)=r_1.x_w'(t)$$

In the general case combinations of these three terms are required so that we can write the differential equation as follows:

$$\text{(D)}\quad y(t)=r_0.x_w(t)+r_{-1}\int x_w(t)dt+r_1.x_w'(t)$$

where $r_0$, $r_{-1}$ and $r_1$ are constants.

The factors appearing in the three parts of this equation can be represented first by the proportional band which is that range of values of the controlled condition which operates the regulating unit over its full range and is usually expressed as a percentage of the scale range. The second factor represents the integral action time which is the time interval in which the integral action, in a controller having proportional and integral action, increases by an amount equal to the proportional action when the deviation is unchanging. The third factor is the derivative action time which is the time interval in which the proportional action in a controller, having proportional and derivative action, increases by an amount equal to the derivative action when the deviation is changed at a constant rate. $(t)$ indicates the dependance of $x$ upon the time as distinct from periodical functions.

Now in an electronic controller according to the present invention, an error signal is applied to an attenuating resistance element, which is used for the setting of the band width for the proportional element action, and is amplified by a proportional band amplifier, and conducted to the integrating circuit, set forth above.

According to another feature of this invention the output of the proportional band amplifying means is conducted through a resistance element from which the integrating circuit derives integrating voltage and further through a resistor where the proportional element voltage is formed.

According to yet another feature of this invention, a voltage derived from a resistance element in series with the proportional band amplifier is transformed by a resistor and capacitor into a derivative action voltage.

According to a still further feature of this invention, the proportional action voltage, the integral action voltage and the derivative action voltage are all arranged in series in the input to the integrator amplifying means (valve).

Still further according to the present invention as applied to an electronic controller the input signal is provided by a direct current potential derived from a transducer which is balanced against a stable adjustable potential representing the desired value and the resulting difference voltage is amplified by at least one amplifier tube according to the proportional band and charges, through a resistor, a capacitor the terminal voltage of which represents integral element of the controller.

According to another feature of this invention, the output of the first amplifier tube is opposed by the same stabilising current as that which provides the desired value current.

According to a yet further feature of the invention, as applied to a controller the voltage across the aforesaid capacitor is added to that of a resistance through which passes the current provided by the aforesaid valve providing for the proportional element and further connected in series is a resistor providing the derivative element whereby the sum of these added voltages controls a tube providing the output of the controller.

According to a still further feature of the invention, the high resistance-capacitance circuit contains an integral action limiting device in the form of a circuit whereby the voltage of the capacitor is balanced against an adjustable voltage in such a way that if the capacitor voltage becomes too large it is discharged through a rectifying element acting as a maximum value limiter.

According to a further feature of the invention, the shift caused by the capacitor voltage necessary to control the output tube is compensated by the introduction of a saturable reactor in the output circuit which feeds a voltage back into the integral action capacitor circuit. The reactor provides a feedback into the resistance-capacitance circuit and it will be understood that this feedback can be achieved in other ways for example by means of a tube circuit.

According to still another feature of the invention, as applied to a controller with manual resetting, switches are provided at least in one point of the output circuit which enable a smooth transfer to be obtained after the controller has been operated on the manual setting while adjusting the charge of the capacitor to the correct value.

In each of the foregoing controllers a part of the output current is fed back into the resistance-capacitance integrating circuit in accordance with the primary invention.

This feedback, as has been stated, can be achieved in a number of ways, for example, by the introduction of a saturable reactor into the output circuit which feeds a voltage back into the integral action resistance-capacitance circuit.

Alternatively, the feed back may be achieved by using a different type of magnetic amplifier or by means of a transistor circuit, or by a feed back amplifier.

In order that the invention may be clearly understood, it will now be described together with examples of controllers embodying the same, with reference to the accompanying drawings.

Figure 1:
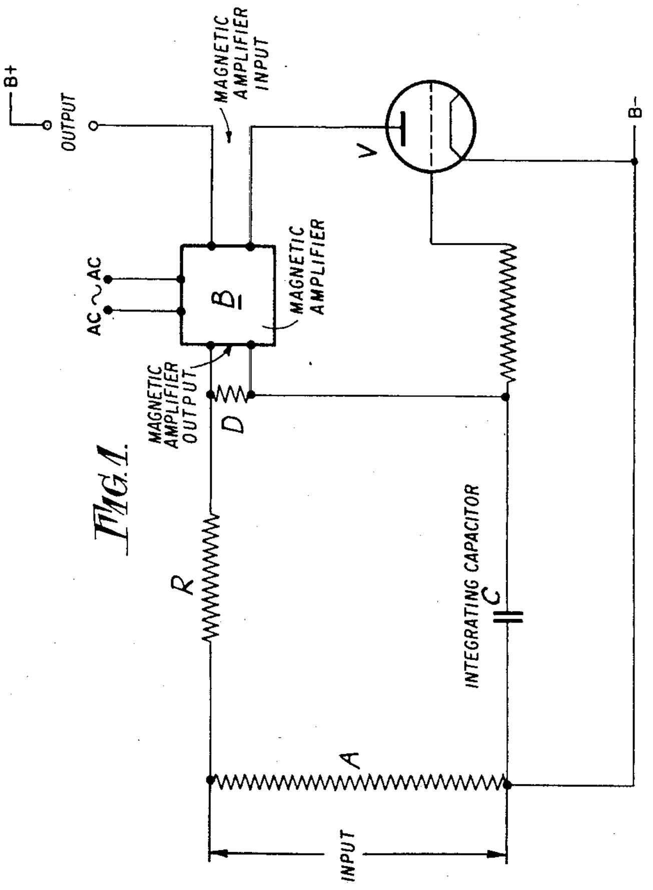
Figure 1 is the circuit of the electronic integrator.

Figure 1 of the accompanying drawings illustrates the integrating circuit according to the present invention. In this circuit the voltage to be integrated is applied across the resistor A and charges the capacitor C in series with the resistor R. The capacitor voltage is transformed, by means of the triode V, into a current and a voltage proportional to that current is fed back through a magnetic amplifier B to the resistance-capacitance circuit comprising the resistor R and the capacitor C. The magnetic amplifier provides an output voltage which is applied to the resistor D. The resistor D is serially connected between the resistor R and capacitor C. The voltage across resistor D is equal and opposite to the voltage across the capacitor C so that the instantaneous voltage across the capacitor C is balanced out. Thus, the charge on the capacitor C does not affect the current flow through the resistor R produced by the input voltage across the resistor A.

The magnetic amplifier B has the great advantage that the insulation between its input and output can be made as high as that of any transformer and, since very little power is required to produce the compensation for the back voltage, the dimensions of the reactor may be very small. This insulation resistance may be of the order of thousands of megohms so that its effect with respect to the unavoidable discharge caused by the leakage resistance of the capacitor C is negligible.

If the insulation of the feed back connection is not very high then the capacitor C discharges itself through a circuit parallel to the resistance capacitance circuit and the integration will no longer be accurate. Subject to this limitation various other conventional means can be used instead of a magnetic amplifier.

It will be obvious that the triode V can be replaced by other amplifying means, having the required characteristics, for instance transistors, as long as the input current required by such amplifying means is small as compared to the maximum discharge current of the condenser permitted for the particular integration.

Figure 2:
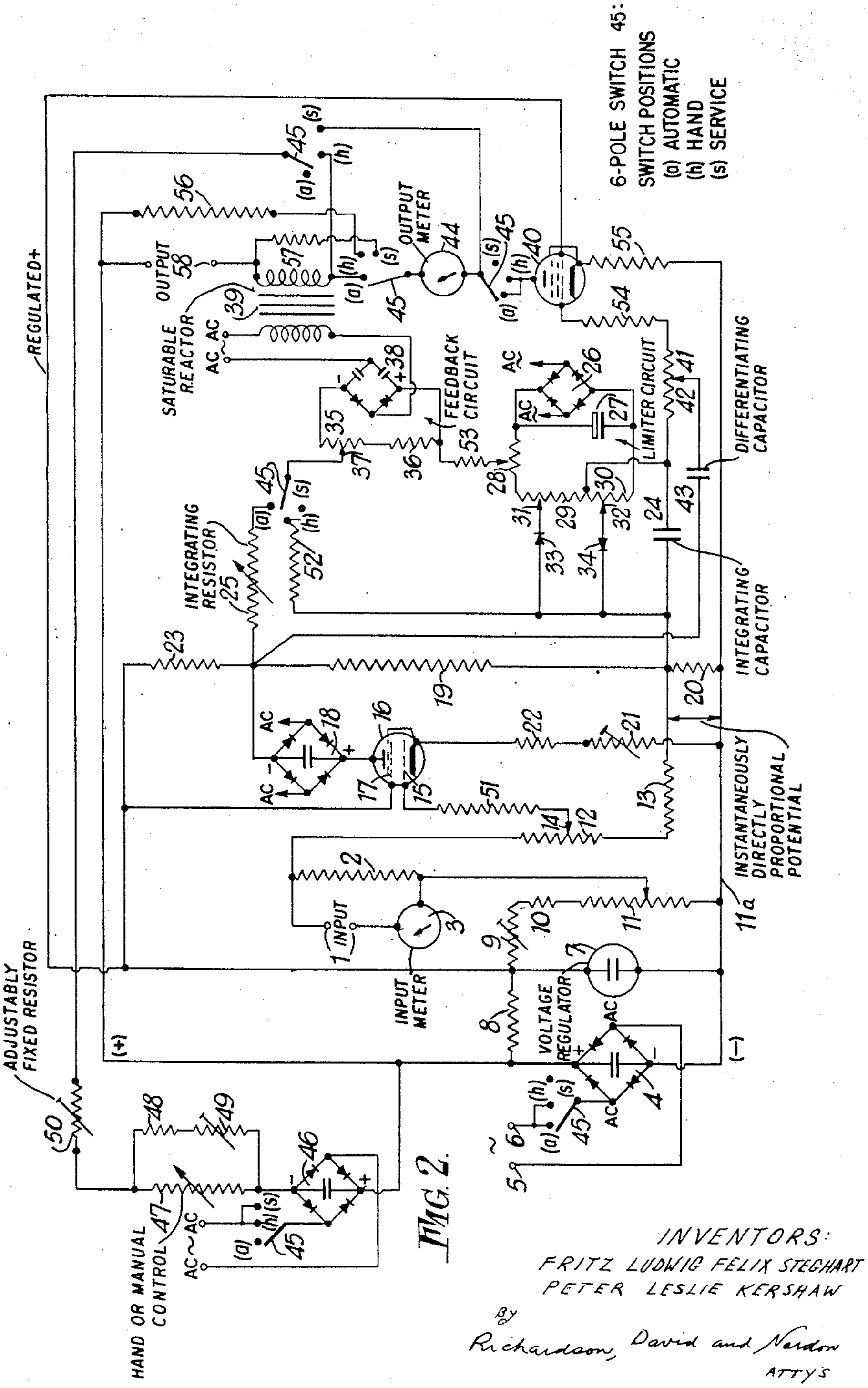
Figure 2 is a circuit diagram of a controller.

In Figure 2 of the drawings there is illustrated a controller in which a potential proportional the measured value of the controlled variable is applied to input terminals 1. The resulting current, which is also proportional to the measured value, flows through a series circuit comprising a resistor 2 and a measured value meter 3. A rectifier 4 is connected to the alternating circuit supply mains at terminals 5 and 6. Alternating current supply connections from terminals 5 and 6 extend to other points in the drawings which are designated "AC". However, these additional connections have been omitted from the drawing for simplicity of illustration. The connection to the rectifier 4 passes through one pole of a six-pole three-position switch 45. The three positions are designated (*a*)—AUTOMATIC, (*h*)—HAND and (*s*)—SERVICE. The purpose of the HAND and SERVICE positions is described in detail below. For the present portion of the description, the switch 45 is assumed to be in its AUTOMATIC position. The rectifier 4 supplies direct current to a D.C. bus designated (+) and (−). A voltage regulator or stabilizing tube 7 is connected to the D.C. bus through a resistor 8. The regulated supply serves as a source of screen voltage for pentodes 16 and 40, later to be described. The regulated supply is also connected to a series circuit comprising an adjustably fixed resistor 9, a fixed resistor 10, and a potentiometer 11. The voltage drop across part of the potentiometer 11 is subtracted from the voltage across the input resistor 2. A potentiometer 12 and resistors 13 and 20 are included in a further circuit which is connected to the input resistor 2. The potentiometer 11 is adjusted to provide a potential with respect to the negative bus **11*a* which is equal and opposite to the potential across the input resistor 2** when as a current corresponding to the desired measured value for the controlled variable flows through the input terminals 1.

The difference between the voltages across resistors 2 and 11 multiplied by a factor dependent on the position of the contact 14 of potentiometer 12 is applied to the control grid 15 of a pentode 16 to control its output. The screen 17 of pentode 16 is connected to the stabilising tube 7. The pentode 16 is supplied with anode potential from a rectifier 18 and its anode current passes through resistors 19 and 20 and returns via biasing resistors 21 and 22 to the cathode of pentode 16. The current in resistance 19 is therefore proportional to the deviation of the controlled value as represented by the voltage on the input resistor 2 minus the desired value potential adjusted on the potentiometer 11 and multiplied by the proportional band factor set on the contact 14. The loss of energy required for these mathematical operations is compensated by the amplification of the pentode 16.

Regulated screen potential from the voltage regulator tube 7 passes through a resistor 23 to the output resistor 19 of pentode 16. This current through resistor 23 balances out the current flow through resistor 19 which is attributable to the normal space current through pentode 16 when the measured variable is at the desired value. Thus, the voltage across the output resistor 19 will vary in magnitude and polarity in accordance with deviations of the measured value of the controlled variable from its desired value as established on the potentiometer 11.

The potential across the output resistor 19 charges an integrating capacitor 24 through a variable resistor 25 of high resistance through intermediate circuitry, later to be described. The charge on the integrating capacitor 24 is proportional to the time integral of the deviation from desired value which appears as the second term of the differential equation D, above. The time constant of the resistance-capacitance integrating circuit 25,24 can be varied by adjustment of the resistor 25.

The intermediate circuitry, referred to above, includes two separate circuits, namely a limiter circuit and a feedback circuit. The limiter circuit comprises a full-wave rectifier 26 supplied from an alternating current supply, the output of rectifier 26 being filtered by an electrolytic capacitor 27. The filtered direct current output of rectifier 26 flows through three serially connected potentiometers 28, 29 and 30. The potentiometer 29 has a movable contact 31 which is connected through a half-wave rectifier 33 to the junction between resistors 19 and 20. The potentiometer 30 has a movable contact 32 which is connected through another half-wave rectifier 34 to the junction between resistors 19 and 20.

The feedback circuit comprises a potentiometer 35 connected in series with a resistor 36. The amount of voltage across potentiometer 35 which is introduced into the resistance-capacitance circuit 25,24 may be varied by adjustment of the movable potentiometer contact 37. The potentiometer 35 and resistor 36 are supplied with controlled rectified alternating current through a full-wave-rectifier, capacitor bridge circuit 38. The bridge circuit 38 is supplied with current from the output winding of a saturable reactor 39. The bridge circuit 38 and saturable reactor 39 operate in the same manner as the magnetic amplifier B of Fig. 1, constituting a feedback link of high insulation resistance between the integrating capacitor 24 and the output of the controller. The integrating capacitor 24 is connected in the control grid circuit of a pentode 40 in series with a potentiometer 41 and the resistor 20. The potentiometer 41 includes a movable contact 42 which is connected through a differentiating capacitor 43 to the output resistor 19 of pentode 16. The voltage drop across the potentiometer is a function of the time rate of change of the potential across output resistor 19 and represents the third term of the differential equation D, above.

An output meter 44 is connected in the anode circuit of pentode 40. For hand operation, there is provided a full-wave rectifier 46 which is energized from the alternating current supply. This hand control circuit includes a calibrated variable resistor 47 which is shunted by the series combination of a fixed resistor 48 and an adjustably fixed resistor 49. The resistors 47, 48 and 49 are connected through a common adjustably fixed resistor 50 and switch 45 in its "HAND" position to the output meter 44.

The movable contact 14 of potentiometer 12 is connected to the control grid 15 of pentode 16 through a series resistor 51. In the "HAND" position of switch 45, a fixed resistor 52 is substituted for the variable resistor 25, pentode 16 and output resistor 19 in the resistance-capacitance integrating circuit. A fixed resistor 53 is serially included in the resistance-capacitance circuit 25,24 being connected to the movable contact of the potentiometer 28 of the limiter circuit. A fixed resistor 54 is connected in series with the control grid of pentode 40. Another fixed resistor 55 connected in series with the cathode of pentode 40 serves as a biasing resistor. A resistor 56 is connected in series with the output meter 44 in the "HAND" position of switch 45. A resistor 57 is connected in series with the output meter 44 only in the "SERVICE" position of switch 45.

The output circuit of the controller appears at terminals 58. The terminals 58 are adapted for connection to a controlling device which responds to changes in the anode current of the pentode 40. For purposes of explanation, it will be assumed that the output current from terminals 28 controls the degree of opening of a valve which regulates the supply of steam to a steam-heated vessel (not shown). The actual temperature of the vessel is measured by a thermocouple (not shown) connected to the input terminals 1 of the regulator. The desired temperature is set on the potentiometer 11. Any deviation of the actual temperature from the desired temperature will produce a corrective change in the output current at terminals 58. This deviation is hereinafter referred to as the error.

The voltage which is built up across resistance 19 is an error voltage which is proportional to the error and a current that is a function of any change of that error voltage which flows through the resistances 19, 25, 35, 36, 53, 28 and 29 and the integrating capacitor 24 back to the resistance 19. The resistance of variable resistor 25 is very much larger than any of the others and the shunting effect of the latter therefore can be neglected. The voltage on the integrating capacitor 24 controls the output of the pentode 40 but the capacitor discharges itself across the resistances 19 and 25. The greater this voltage the greater is the discharge current which expresses itself by an off-set of the controlled value necessary to maintain a voltage appropriate to the error on the integrating capacitor 24.

The output current from the pentode 40 flows through the saturable reactor 39 and produces a current through the feedback circuit resistors 35 and 36 causing a voltage drop which is a function of the output current and is in opposition to the voltage on the integrating capacitor 24. Since the output current in turn is a function of the voltage on the integrating capacitor it is thereby possible to compensate fully for such a voltage and this makes it possible to increase the operative grid voltage to a reasonable value without affecting the accuracy of the controller.

The limiter circuit fed by the rectifier 26 serves as integral action limitation. During the starting-up of a plant a very large error may occur for some time and this may cause the integrating circuit fully to charge the condenser 24 resulting in a much larger over-swing than would be obtained if the charge on the integrating capacitor 24 could be limited. An appropriate setting of the proportional band helps but the method used in general heretofore to avoid this over-swing is to use proportional plus derivative actions. If this mode of operation does not lead to a proportional band which is sufficiently narrow to restrict off-sets due to load changes, integral action is introduced, for instance first proportional plus derivative actions and subsequently proportional plus integral actions.

The present controller works differently. In the circuit associated with the potentiometers 29, 30 the voltage on the condenser 24 is opposed by a part of the voltage on the potentiometers 29 and 30. If for instance a current tries to flow from the integrating capacitor 24 in a clockwise direction, then the rectifier 34 would oppose its flow through the potentiometer 30. On the other hand, the current cannot flow through the rectifier 33 because it is opposed by the voltage on the potentiometer 29 up to a certain value which depends on the setting of contact 31. Beyond that value current from integrating capacitor 24 can discharge through the rectifier 33 and therefore its voltage is limited according to the setting of the contact 31. Rectifier 34 operates in the other direction. After the start of the plant the limitation is removed to enable the controller to work even beyond the points set temporarily for integral action limitation.

As stated above, the six-pole switch 45 has three positions, AUTOMATIC, HAND and SERVICE designated *a. h. s*, respectively. In the AUTOMATIC position the controller is clearly automatic. In the HAND position the regulating unit is controlled directly by the hand control which is constituted by the variable resistor 47. The power for this control is obtained from the rectifier 46. This hand control is calibrated linearly in terms of the position of the regulating unit and has the same scale as the output meter 44. When changing from automatic to hand control so as not to upset the system, the index of the hand control variable resistor 47 should be set to agree with the pointer of the output meter 44. The position of the controlled device or steam valve under hand control will then be exactly the same as it was under auto control. When the system is once taken over to hand control the position of the controlled device may be altered by the hand control to any desired position.

The current produced by the saturable reactor 39 flows through the resistors 35 and 36 of the feedback circuit and produces a voltage which, in the HAND operating position of the switch 45, is connected through the series resistance 52 through the integrating capacitor 24. The integral time resistance 25 is disconnected. The current through the saturable reactor therefore charges the integrating capacitor 24 to the voltage across the feedback circuit resistors 35 and 36 which is the value required to give a controller output similar to the current flowing through the energizing windings of the reactor from the hand control.

The integral part of the controller therefore follows a function of the output to the regulating unit as adjusted by the hand control and is independent of any measured and desired value. The actual output from the controller pentode 40 in this state which passes through the load resistance 56 is the sum of the simulated integral element value plus the proportiontal element and the derivative element value which latter are dependent on the error signal which is the difference between the measured and the desired value. When it is desired to switch back to automatic control the integrating capacitor 24 will always have the correct charge on it for the particular output that is passing through the controlled device under the hand control, and the controller output meter should be lined up either by altering the desired value or the position of the hand control. When these are in agreement the measured and desired values will be equal and no sudden shift in conditions will occur when the controller is switched to automatic operation.

The SERVICE position of the switch 45 cuts out the automatic controller output and switches the meter 44 in series with the controlled device connected to the terminals 58. Except for the rectifier 46, the mains transformer (not shown in the drawing), the hand control potentiometer 47 and the meter 44, all the rest of the controller is inoperative and the chassis containing the two pentodes, the measuring circuit and the desired value circuit may be removed, also the case containing the adjustments for the proportional band, integral and derivative time constants. This chassis may be taken out of the controller or replaced by another chassis without upsetting the operation of the plant.

When the controller is again switched to hand control the integral condenser will charge up according to the current through the regulating unit in preparation for the smooth transfer to automatic control.

The accuracy of the controller depends apart from the measured value, on the stability obtained by means of the voltage regulator tube 7 and on the zero stability of the voltage produced by the two opposing currents across the resistance 19. This stability is very high since there is a large amount of feed-back when a wide proportional band is used and naturally the sensitivity is very great when the proportional band is small. The device for compensating for the voltage on integrating capacitor 24 keeps the overall accuracy of the controller high.

Pentode 16 (type 6AM6) has a continuous rating of 10 milliamps but this value is only reached in the extreme case of maximum error in one direction. If there is no error or only a small error as is usual with an automatic controller, the current passed by this valve is only 5 milliamps and it is therefore 50% under-run. The pentode 40 passing the controller output (type 6CH6) has a continuous rating of 40 milliamps whereas its current ranges between 3 and 15 milliamps. This valve too is therefore substantially under-run. The total heat dissipation of this controller is of the order of 25 watts, a large part of which is dissipated without entering the measuring and regulating compartment.

The controller described may, with suitably valued components control flow and pressure for which the integral action time is 1 minute and the derivative action time is 6 secs., the proportional band being 0–200%. By altering the appropriate values the time constants and the value of the proportional band can be changed according to other requirements.

Figure 3:
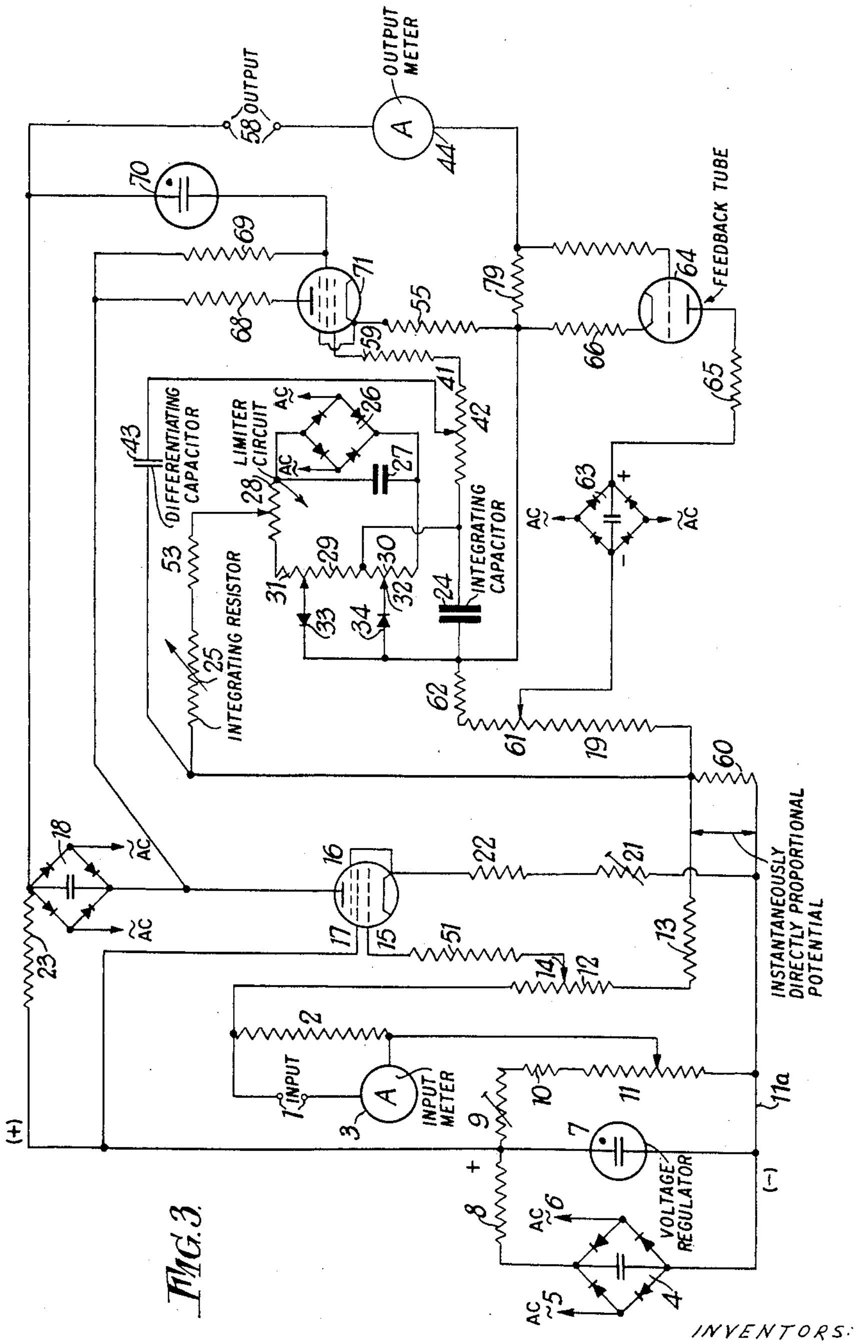
Figure 3 is a modified circuit.

In Figure 3 of the drawings there is illustrated a controller incorporating a tube-type feed back amplifier in place of the saturable reactor 39 to compensate for the charge voltage on the integrating capacitor 24. To simplify the circuit, the automanual switch has been eliminated and no transfer circuit has been shown. The whole of the desired value, measured value and proportional band is carried out as previously described; the resistance 20 in the circuit shown in Figure 2 has been renumbered 60, as this resistance is now only used for the feed-back on the proportional band and not to develop the voltage for the output valve in addition as before. The standing current from the proportional pentode 16 is opposed as before from the voltage across the regulator tube 7 through the resistance 23. The values of this opposing current and the anode current of pentode 16 will both be appreciably great in this case, as the resulting proportional band current which varies from zero in either direction, flows through the controlled device (not shown) connected to the output terminals 58 and therefore for 100% steam valve positioning in either direction it would have to be ±12 ma. In actual practice, the current in the output circuit will be zero at approximately 50% opening of the controlled steam valve, so that the output current at terminals 58 must swing at least ±6 ma. and not ±3 ma. as in the previous controller. This means that a 6OH6 or similar pentode must be used for the output pentode 71 and the voltage regulator tube 7 must take a larger current. This two-way proportional current flows through the output circuit 58, the ammeter 44 and resistances 79, 62, 61 19 and 60 and passes the proportional element directly on to the controlled device. Therefore output valve 71 only has to handle the integral and derivative currents. The potentiometer 61 and resistor 62 take the current from which draws power from rectifier 63 and load resistance 65 feedback triode 64. The drop across these resistances due to this current is the voltage which compensates for the charge on integrating capacitor 24. These two resistances 61 and 62 are similar to the resistances 35 and 36 in the previous controller. In this case the feedback adjustment is carried out on the potentiometer 61 instead of the potentiometer 35 of Fig. 2. The rest of charging circuit for the integrating capacitor 24 is exactly similar, the charging current passing through the integral adjustment resistor 25, the resistor 53, the potential divider 28 and the limiter circuit. As the output current of the two pentodes 16 and 71 is added before passing through the controlled device, the rectifier supply 4 which in the previous case only supplied the pentode 16, has also to supply the output pentode 71. Due to the large voltage drop across resistance 19, due to proportional error, it is not possible to energize the screen of the output pentode 71 from the regulated supply using the regulator tube 7. Therefore, another circuit is used where load and screen resistors 68 and 69, respectively, are associated with the output pentode 71. The screen voltage is stabilised by an additional voltage regulator tube 70 so that its voltage relative to cathode only varies by the drop across the output 58, the ammeter 44 and the resistances 79 and 55. The voltage drop across the resistance 69 will always be the difference between the voltage on rectifier 18 and stabilising tube 70 and will remain constant irrespective of the anode current, while the drop across the resistance 68 will fluctuate with the anode current. Also the current from pentode 71 which passes through the output 58 will be the sum of both the screen and anode currents. The feedback tube 64 has been shown as a triode as there is no simple way of obtaining a screen supply. Resistance 66 acts as a negative feedback resistance which tends to stabilise the output and make it possible to replace the valve without much adjustment. The grid voltage for the feedback triode 64 is developed across the resistance 79 which is connected in series to the output, the voltage across which will depend upon the total output. The output of the feedback triode 64 is therefore proportional to the voltage on the integrating capacitor 24 when there is no error; with an error, as before the proportional element can be taken care of in the calibration of the integral time and the transient effect of the derivative will cause a small error. The output current from the triode 64 passes through the potentiometer 61 and resistor 62, the values of which are so arranged that the voltage drop across them due to this current compensates the voltage on the condenser 24. The fixed bias of the limiter circuit which is developed across potentiometers 28 and 29 and resistor 30 is so adjusted that with no voltage drop across the fixed resistor 19, the algebraic sum of the voltage drops across resistor 62, potentiometer 61, integrating capacitor 24, potentiometer 29 and potentiometer 28 at all times is equal to zero, regardless of the charge on the integrating capacitor 24 which is compensated by the voltage drop across potentiometer 61 and resistor 62. The voltage drops in the limiter circuit of Fig. 3 are in the opposite direction to those in Fig. 2. Accordingly, the polarities of the limiting rectifiers 33 and 34 are reversed with respect to those in Fig. 2.

In addition to the feedback current from triode 64, the proportional current also passes through potentiometer 61 and resistor 62. The effect of the proportional current in potentiometer 61 and resistor 62 is the same as its effect in resistor 19 and can be allowed for during calibration. It also alters the anode voltage of the feedback triode 64. However, this effect is a linear effect and can be compensated during calibration. Thus, it will be seen that the controller of Fig. 3 using a tube-type feedback is very similar in its performance to the performance of the controller circuit with a saturable reactor as previously described.

Figure 4:
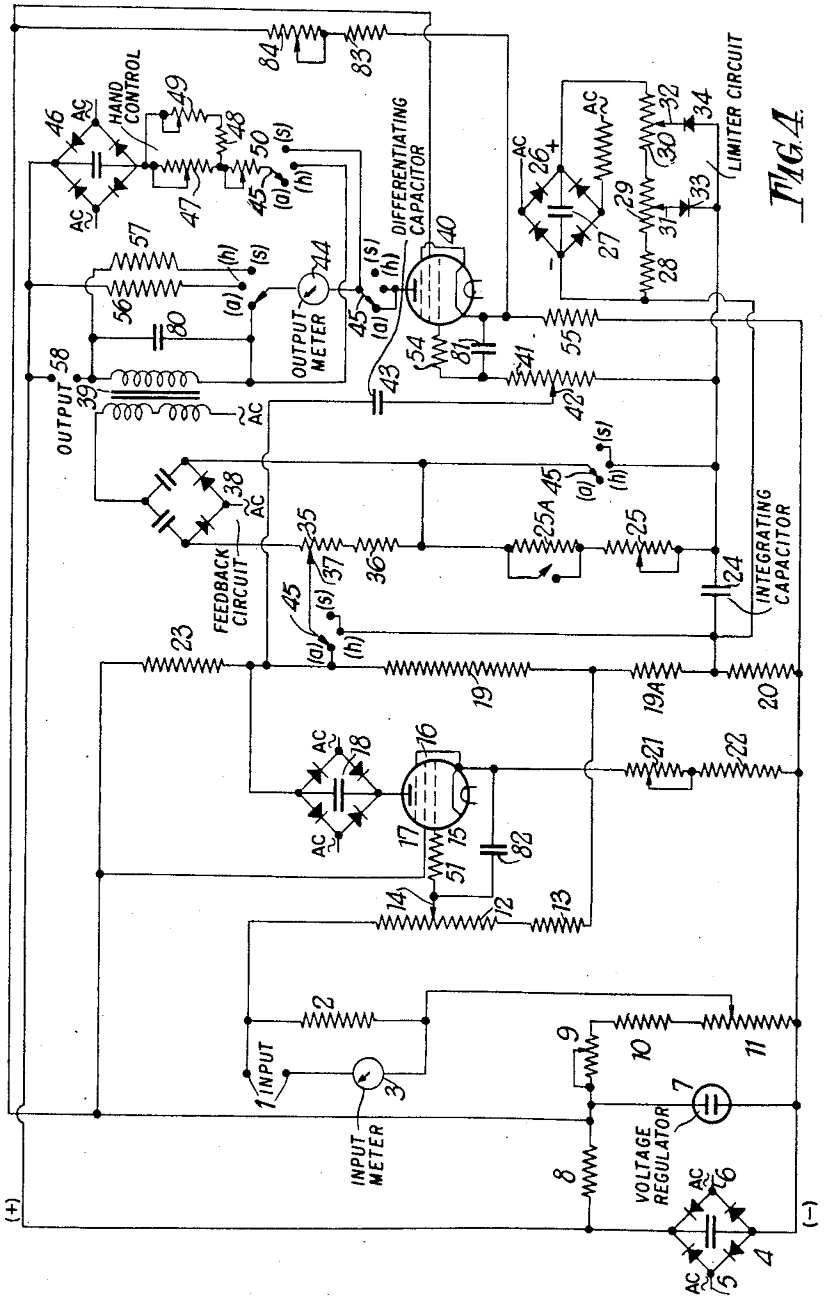
Figure 4 is another circuit, modified as compared with those illustrated in Figures 2 and 3.

The modified three term controller illustrated in Figure 4 is basically the same as that illustrated in Figure 2 and similar items bear like reference numbers but in this circuit the condenser 24 is charged in one direction only, which is important, since it makes it possible to use electrolytic condensers with much smaller dimensions than have the paper insulated types. Furthermore the condenser voltage and the reactor voltage are equal and opposite and there is therefore no need for the extra biasing voltage used in the previous layout.

For many applications, the signal coming to a controller is not unidirectional but for instance in the case of a temperature measurement by means of a Wheatstone bridge the error signal is positive or negative. In such a case the setting of the desired value is carried out on the bridge by shifting its balance point and the stabiliser 7 is no longer used for balancing the measured voltage, but only for the stabilisation of the circuit.

In the circuit of Figure 4, 80 is a smoothing condenser and 81 is a condenser to give the output pentode 40 a time constant. Condenser 82 bypasses any A.C. ripple from the measured value. Resistors 83 and 84 (56 previously) adjust the current through resistance 55 to give a fixed bias to the grid of valve 40.

For the practical carrying into effect of the circuit illustrated in Figure 4, the values of its various components are set out below against the numbers by which such components are identified in the foregoing description, namely:

| | |
|---|---|
| 2 | 2000 ohms. |
| 4 | Rectifier 240 v./4 μF. |
| 7 | Argon stabiliser 150 v. |
| 8 | 3000 ohms 4 watt. |
| 9 | 4000 ohms trim. |
| 10 | 28,000 ohms. |
| 11 | 20,000 ohms potentiometer. |
| 12 | 0.1 megohms potentiometer. |
| 13 | 25,000 ohms. |
| 16 | 6AM6. |
| 18 | 200 volt rectifier 2 μF. |
| 19 | 6000 ohms. |
| 19a | 4000 ohms. |
| 20 | 1500 ohms. |
| 21 | 50 ohms trim. |
| 22 | 170 ohms. |
| 23 | 30,000 ohms 1 watt. |
| 24 | 3×160 μF. condensers in parallel. |
| 25 | 5 megohms potentiometer. |
| 25a | 5 megohms. |
| 26 | 24 volt rectifier. |
| 27 | 2 μF. |
| 28 | 1200 ohms. |
| 29 | 2000 ohms potentiometer. |
| 30 | 2000 ohms potentiometer. |
| 33/34 | Junction diodes. |
| 35 | 1000 ohms potentiometer. |
| 36 | 3300 ohms. |
| 38 | Voltage double rectifier. |
| 39 | Reactor of high resistance. |
| 40 | 6CH6. |
| 41 | 5 megohms. |
| 43 | 1 μF. |
| 46 | 60 v. rect. 2 μF. |
| 47 | 10,000 ohms potentiometer. |
| 48 | 60,000 ohms. |
| 49 | 0.5 megohms potentiometer. |
| 50 | 2000 ohms potentiometer. |
| 51 | 10,000 ohms. |

| | |
|---|---|
| 54 | 10,000 ohms. |
| 55 | 525 ohms. |
| 56 | 3000 ohms. |
| 57 | 1200 ohms. |
| 80 | 15 μF. |
| 81 | 2 μF. |
| 82 | 50 μF. |
| 83 | 8000 ohms. |
| 84 | 4000 potentiometer. |
| 85 | 600 ohms. |

One of the most important applications of the primary invention of the integrator is in connection with computers. Here it is of special importance that the integrator circuit even with small amplification will give unity compensation for the back voltage of the condenser. Since it is comparatively easy to obtain linear amplification and feed-back the accuracy that can be obtained in this way is far greater than with other circuits. The use of integrating circuits in computers is already known in the art.

We claim:

1. An electronic controller having a direct current continuous input; means to give a direct current error signal; means amplifying the error signal; a first and second resistance in series with the amplifying means, the voltage across said second resistance being a proportional error voltage; a series-connected third resistance and first condenser in parallel to said first resistance, the first condenser being connected to the junction of the first and second resistances and the voltage across said first condenser being an integral error voltage; a series-connected second condenser and fourth resistance connected in parallel to said third resistance, the second condenser being connected to the first and third resistances, the fourth resistance being connected to the junction of the third resistance and first condenser and the voltage across the said fourth resistance being a differential error voltage; a first connection from the end of the second resistance remote from the first resistance; a second connection from the junction of the fourth resistance and second condenser, the voltage across said first and second connections being a summation of the proportional, integral and differential error voltages; amplifying means to measure and transform the voltage across said first and second connections to give a controller output; and high insulation feedback means feeding back a function of said controller output to said first condenser to compensate the voltage thereof.

2. An electronic controller for a controlled system, comprising means providing an error current proportional to the error in the controlled system, a resistance fed by the error current to provide a proportional action voltage, a second resistance, a series connected resistance and condenser integrating the voltage produced by said error current in said second resistance to give integral action voltage, means connecting said proportional action voltage and integral action voltage in summation to give a two term control voltage, amplifying means measuring and transforming said two term control voltage to give a controller output, and high insulation feedback means passing a function of said controller output to said condenser to substantially compensate the voltage thereof.

3. An electric controller comprising an input circuit adapted to receive a direct current signal which varies with positive and negative going excursions to either side of zero, the variations being in accordance with variations in a quantitatively measured factor controlled by said controller, a first resistor in said input circuit, the potential across said first resistor varying in accordance with said variations, a series connected combination of a second resistor and a capacitor connected to said first resistor so that the potential across said capacitor varies in accordance with the time integral of the magnitude of said signal, amplifier means having its input connected for response to the potential across said capacitor, high resistance coupling means connecting the output of said amplifier means to the circuit of said second resistor and capacitor, said amplifier means introducing a potential into said last-named circuit through said coupling means which is equal and opposite to the potential across said capacitor, and an output circuit connected to the output of said amplifier means, said output circuit being adapted for connection to control means for varying said controlled factor in accordance with said time integral.

4. An electric controller comprising an input circuit adapted to receive a direct current signal which varies in accordance with variations in a quantitatively measured factor controlled by said controller, a first resistor in said input circuit, the potential across said first resistor varying in accordance with said variations, a series connected combination of a second resistor and a capacitor connected to said first resistor so that the potential across said capacitor varies in accordance with the time integral of the magnitude of said signal, amplifier means having its input connected for response to the potential across said capacitor, high resistance coupling means connecting the output of said amplifier means to the circuit of said second resistor and capacitor, said amplifier means introducing a potential into said last-named circuit through said coupling means which is equal and opposite to the potential across said capacitor, and an output circuit connected to the output of said amplifier means, said output circuit being adapted for connection to control means for varying said controlled factor in accordance with said time integral.

5. An electric controller according to claim 4, further comprising a resistor-capacitor differentiating circuit connected to said input circuit, circuit means connecting said differentiating circuit to said output circuit for introducing a potential in said output circuit which is proportional to the time rate of change of said signal, and means for adjusting the relative intensities of said time integral and time rate of change effects in said output circuit.

6. An electric controller according to claim 4, further comprising a regulated adjustable source of direct current the constant potential of which may be varied manually, circuit means for comparing said adjustable constant potential with the potential across said first resistor, the algebraic difference between said adjustable potential and the potential across first resistor constituting an error signal the magnitude and direction of which varies in accordance with deviations of said controlled factor from a predetermined desired magnitude, said second resistor and capacitor being connected to derive a potential which varies in accordance with the time integral of the magnitude of said error signal.

7. An electric controller according to claim 4, further comprising circuit means interconnecting said controller input circuit and said controller output circuit, said last-named circuit means introducing into said output circuit a potential which is proportional to the potential across said first resistor.

8. An electric controller according to claim 7, further comprising a resistor-capacitor differentiating circuit connected to said input circuit, circuit means connecting said differentiating circuit to said output circuit for introducing a potential in said output circuit which is proportional to the time rate of change of said signal, and means for adjusting the relative intensities of said time integral and time rate of change effects in said output circuit.

9. An electric controller according to claim 4, wherein said high resistance coupling means comprises a magnetic amplifier interposing high resistance insulation between said output of said amplifier means and said circuit of said second resistor and capacitor.

(References on following page)

References Cited in the file of this patent

UNITED STATES PATENTS

| | | |
|---|---|---|
| 2,140,350 | Dawson | Dec. 13, 1938 |
| 2,251,973 | Beale | Aug. 12, 1941 |
| 2,462,456 | Bedford | Feb. 22, 1949 |
| 2,463,553 | Olesen | Mar. 8, 1949 |
| 2,506,770 | Braden | May 9, 1950 |
| 2,511,564 | Callan | June 13, 1950 |
| 2,566,832 | Grundmann | Sept. 4, 1951 |
| 2,584,954 | Williams | Feb. 5, 1952 |
| 2,608,678 | Marchment | Aug. 26, 1952 |
| 2,622,231 | Gray | Dec. 16, 1952 |
| 2,637,820 | McCreary | May 5, 1953 |
| 2,687,474 | Richmond | Aug. 24, 1954 |
| 2,708,258 | Westwood | May 10, 1955 |
| 2,728,041 | Boundy | Dec. 20, 1955 |